(12) United States Patent
Stark

(10) Patent No.: US 9,933,106 B2
(45) Date of Patent: Apr. 3, 2018

(54) HEIGHT ADJUSTABLE SUPPORT

(71) Applicant: Capsa Solutions, LLC, Portland, OR (US)

(72) Inventor: Jeffrey P. Stark, Davidson, NC (US)

(*) Notice: Subject to any disclaimer, the term of this patent is extended or adjusted under 35 U.S.C. 154(b) by 86 days.

(21) Appl. No.: 13/803,923

(22) Filed: Mar. 14, 2013

(65) Prior Publication Data

US 2014/0265193 A1  Sep. 18, 2014

(51) Int. Cl.
| | |
|---|---|
| *F16M 11/04* | (2006.01) |
| *B62B 3/10* | (2006.01) |
| *B62B 3/02* | (2006.01) |
| *F16M 11/12* | (2006.01) |
| *F16M 11/08* | (2006.01) |
| *F16M 11/42* | (2006.01) |

(52) U.S. Cl.
CPC .............. *F16M 11/04* (2013.01); *B62B 3/02* (2013.01); *B62B 3/10* (2013.01); *F16M 11/045* (2013.01); *F16M 11/08* (2013.01); *F16M 11/12* (2013.01); *B62B 2202/56* (2013.01); *B62B 2206/06* (2013.01); *F16M 11/42* (2013.01)

(58) Field of Classification Search
CPC .... F16M 11/04; F16M 11/043; F16M 11/045; F16M 11/06; F16M 11/08; F16M 11/12; F16M 11/2014; F16M 11/42; B62B 2206/02
USPC ......... 248/274.1, 121, 129, 128, 132, 285.1, 248/279.1, 918, 298.1, 122.1, 124.1, 248/125.1; 280/47.34, 47.35, 35
See application file for complete search history.

(56) References Cited

U.S. PATENT DOCUMENTS

| | | | |
|---|---|---|---|
| 844,083 A | 2/1907 | Barrella | |
| 1,730,028 A | 10/1928 | Ball | |
| 2,077,337 A | 4/1937 | Lifvendahl et al. | |
| 3,089,742 A | 5/1963 | Powell | |
| 3,862,734 A * | 1/1975 | Buchin et al. | 248/125.2 |
| 3,999,733 A | 12/1976 | Harder, Jr. et al. | |
| 4,516,751 A | 5/1985 | Westbrook | |
| 4,544,121 A | 10/1985 | Komura | |
| 4,687,167 A | 8/1987 | Skalka et al. | |

(Continued)

FOREIGN PATENT DOCUMENTS

| | | |
|---|---|---|
| DE | 3409990 A1 | 7/1984 |
| FR | 2783412 A1 | 3/2000 |
| GB | 2285911 A | 8/1995 |

OTHER PUBLICATIONS

U.S. Appl. No. 12/636,181, Office Action, dated Oct. 21, 2011.
U.S. Appl. No. 12/636,181, Office Action, dated Feb. 29, 2012.

*Primary Examiner* — Anita M King
(74) *Attorney, Agent, or Firm* — Standley Law Group LLP

(57) ABSTRACT

A support comprises a device mount adapted to be connected to a user device such as a monitor. The device mount is supported on a first pivot for rotational motion about a first axis of rotation. A slide assembly comprises a carriage where the carriage is mounted for translational movement and supports the first pivot such that the first axis of rotation may be moved transversely. The support may be mounted on a technology cart comprising an upright supported on wheels where the upright supports a movable work platform. The support may be located in front of and closely adjacent to the upright where the movement of the pivot allows the user device to be rotated without interference from the upright.

15 Claims, 9 Drawing Sheets

(56) References Cited

U.S. PATENT DOCUMENTS

| | | |
|---|---|---|
| 4,836,478 A | 1/1989 | Sweere |
| 4,907,773 A | 3/1990 | Menchetti et al. |
| 5,007,608 A | 4/1991 | Carroll, Jr. |
| 5,240,215 A | 8/1993 | Moore |
| 5,360,566 A | 11/1994 | Stevenson |
| 5,487,525 A | 1/1996 | Drabczyk et al. |
| 5,497,429 A | 3/1996 | Shibuya |
| D368,521 S | 4/1996 | Asai et al. |
| 5,632,462 A | 5/1997 | Kallas |
| D380,736 S | 7/1997 | Theis et al. |
| D393,382 S * | 4/1998 | Rutter et al. .................. D6/474 |
| 5,738,316 A | 4/1998 | Sweere et al. |
| 5,743,503 A | 4/1998 | Voeller et al. |
| 5,791,623 A | 8/1998 | Louridas |
| 5,797,568 A | 8/1998 | Canton Gongora et al. |
| 5,842,672 A | 12/1998 | Sweere et al. |
| 5,876,008 A | 3/1999 | Sweere et al. |
| D412,161 S | 7/1999 | Theis et al. |
| 5,918,841 A | 7/1999 | Sweere et al. |
| 5,924,665 A | 7/1999 | Sweere et al. |
| D413,110 S | 8/1999 | Sweere et al. |
| 5,944,896 A | 8/1999 | Landesman et al. |
| 5,967,479 A | 10/1999 | Sweere et al. |
| 5,992,809 A | 11/1999 | Sweere et al. |
| 6,012,693 A | 1/2000 | Voeller et al. |
| 6,015,120 A | 1/2000 | Sweere et al. |
| 6,019,332 A | 2/2000 | Sweere et al. |
| D423,745 S | 4/2000 | Theis et al. |
| 6,102,355 A * | 8/2000 | Rood ...................... A61H 5/00 108/147 |
| D431,736 S | 10/2000 | O'Brien et al. |
| 6,189,849 B1 | 2/2001 | Sweere et al. |
| 6,233,791 B1 | 5/2001 | Theis |
| D450,903 S | 11/2001 | Wacker et al. |
| 6,354,549 B2 | 3/2002 | Sweere et al. |
| D455,916 S | 4/2002 | Fluhrer et al. |
| 6,367,756 B1 | 4/2002 | Wang |
| 6,380,484 B1 | 4/2002 | Theis et al. |
| 6,397,761 B1 * | 6/2002 | Moore ...................... 108/50.01 |
| 6,409,134 B1 | 6/2002 | Oddsen, Jr. |
| 6,419,196 B1 | 7/2002 | Sweere et al. |
| 6,435,109 B1 * | 8/2002 | Dell et al. ................ 108/144.11 |
| 6,493,220 B1 | 12/2002 | Clark et al. |
| 6,581,887 B2 | 6/2003 | Lapidez |
| D477,325 S | 7/2003 | Theis et al. |
| D477,606 S | 7/2003 | Theis et al. |
| 6,709,058 B1 | 3/2004 | Diffrient |
| 6,712,008 B1 | 3/2004 | Habenicht et al. |
| 6,721,178 B1 | 4/2004 | Clark et al. |
| 6,783,105 B2 | 8/2004 | Oddson, Jr. |
| 6,796,536 B1 * | 9/2004 | Sevier, IV ...................... 248/121 |
| 6,840,180 B2 * | 1/2005 | Ulmer ........................... 108/13 |
| 6,863,252 B2 | 3/2005 | Bosson |
| 6,883,764 B1 | 4/2005 | Mileos et al. |
| 6,959,965 B2 | 11/2005 | Diffrient |
| 6,994,306 B1 | 2/2006 | Sweere et al. |
| 6,997,422 B2 | 2/2006 | Sweere et al. |
| 7,009,840 B2 | 3/2006 | Clark et al. |
| 7,032,870 B2 | 4/2006 | Sweere et al. |
| 7,048,242 B2 | 5/2006 | Oddsen, Jr. |
| 7,063,296 B2 | 6/2006 | Williams |
| 7,066,435 B2 | 6/2006 | Oddsen, Jr. et al. |
| 7,147,190 B2 | 12/2006 | Welles et al. |
| 7,152,488 B2 | 12/2006 | Hedrich et al. |
| D535,432 S | 1/2007 | Diffrient |
| D537,323 S | 2/2007 | Saez |
| 7,195,213 B2 | 3/2007 | Weatherly |
| D539,794 S * | 4/2007 | Rossini et al. ................ D14/302 |
| 7,252,277 B2 | 8/2007 | Sweere et al. |
| 7,303,173 B2 | 12/2007 | Mileous |
| D584,908 S | 1/2009 | Diffrient |
| 7,472,458 B2 | 1/2009 | Oddsen |
| 7,475,946 B2 | 1/2009 | Diffrient |
| 7,481,170 B2 | 1/2009 | Sommerfield |
| 7,487,940 B2 | 2/2009 | Saez et al. |
| 7,621,544 B2 * | 11/2009 | Rossini ........................ 280/79.3 |
| 7,793,897 B2 * | 9/2010 | Wang et al. ................ 248/125.2 |
| 7,954,780 B2 | 6/2011 | Dittmer |
| 7,963,488 B2 * | 6/2011 | Hasegawa ............ F16M 11/105 248/183.2 |
| 8,180,485 B2 * | 5/2012 | Reckelhoff ..................... 700/242 |
| 8,181,920 B2 * | 5/2012 | Brown ................ A47B 13/023 108/50.01 |
| 8,286,977 B2 * | 10/2012 | Butler et al. ................. 280/47.35 |
| 8,313,074 B2 * | 11/2012 | Wang ................... F16M 11/105 248/157 |
| 8,526,176 B2 * | 9/2013 | Clark et al. ............. 361/679.41 |
| 8,662,605 B2 * | 3/2014 | McRorie et al. ............. 312/276 |
| 8,677,911 B2 * | 3/2014 | McRorie ..................... 108/50.02 |
| 8,714,569 B2 * | 5/2014 | Lu et al. ......................... 280/35 |
| 8,757,569 B2 * | 6/2014 | Chen et al. .................. 248/298.1 |
| 8,812,153 B2 * | 8/2014 | Reckelhoff .................... 700/243 |
| 9,332,839 B2 * | 5/2016 | Ringlein ................ A47B 87/002 |
| 2003/0001057 A1 | 1/2003 | Sweere et al. |
| 2003/0057340 A1 | 3/2003 | Mann et al. |
| 2005/0062238 A1 | 3/2005 | Broadfield et al. |
| 2005/0062370 A1 | 3/2005 | Miller |
| 2007/0227409 A1 * | 10/2007 | Chu ............................... 108/50.02 |
| 2007/0259554 A1 | 11/2007 | Lindblad et al. |
| 2007/0295870 A1 | 12/2007 | Peterson et al. |
| 2008/0026892 A1 | 1/2008 | Asamari et al. |
| 2008/0142660 A1 | 6/2008 | Goldberg et al. |
| 2008/0168930 A1 | 7/2008 | Calero |
| 2008/0258029 A1 | 10/2008 | Zhang |
| 2009/0212184 A1 | 8/2009 | Bourgeois et al. |
| 2011/0233350 A1 | 9/2011 | Burgess et al. |
| 2013/0200579 A1 * | 8/2013 | Abernethy ................ B62B 3/02 280/6.15 |
| 2013/0279090 A1 * | 10/2013 | Brandt ..................... H05K 7/00 361/679.01 |
| 2015/0329062 A1 * | 11/2015 | Ackeret ................ B60R 11/02 248/220.22 |

\* cited by examiner

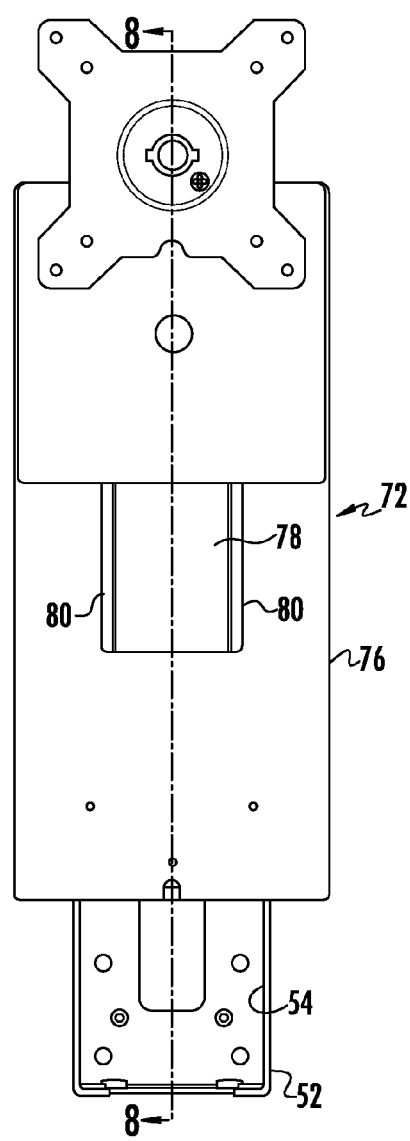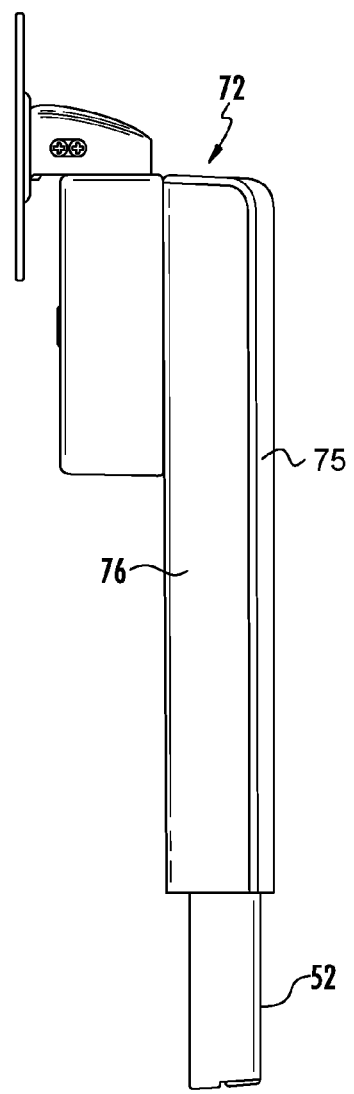
FIG. 4
FIG. 5

HEIGHT ADJUSTABLE SUPPORT

BACKGROUND OF THE INVENTION

Supports for devices such as monitors, televisions, other information technology (IT) equipment or other similar devices are known and may comprise articulating arms. Technology carts that may typically comprise a rolling cart that includes IT technology such as a computer, CPU, monitor, keyboard, or other equipment or devices are also known. Technology carts are often found in healthcare environments such as hospitals where they may be moved between patient areas for use by a healthcare professional. Supports may be used to support a monitor on a technology cart and in environments and configurations other than technology carts such as wall mounted supports, cabinet mounted supports, table top supports or the like.

SUMMARY

In some embodiments, a support comprises a device mount adapted to be connected to a user device. The device mount is supported on a first pivot for rotational motion about a first axis of rotation. A slide assembly comprises a carriage where the carriage is mounted for translational movement and supports the first pivot such that the first axis of rotation may be translated transversely.

In some embodiments, the first axis of rotation is substantially vertical. The slide assembly may be mounted on a lift mechanism such that the height of the device mount may be adjusted. The slide assembly may be mounted on a column that is adapted to be mounted to a surface such that the column is disposed substantially vertically. The column may comprise the lift mechanism for supporting the slide assembly for substantial vertical movement. The slide assembly may comprise a rail that supports the carriage such that the carriage may be manually moved transversely relative to the support. The slide assembly may support the carriage for substantially horizontal movement. The slide assembly may comprise a first rail and a second rail that extend substantially parallel to one another and substantially horizontally and the carriage may span the first rail and the second rail and include an engagement structure that freely slides on the rails. A center position locater may be provided for locating a center position of the carriage. A support plate may support the slide assembly where the center position locater comprises a ball on one of the carriage and support plate that releasably engages a detent on the other one of the carriage and the support plate.

In some embodiments, a technology cart comprises an upright supported on wheels. The upright has a first lateral edge and a second lateral edge and supports a movable work platform. A device mount is adapted to be connected to a monitor where the device mount is mounted to the movable work surface such that the device mount is located adjacent the upright. The device mount is supported on a first pivot for rotational motion about a first axis of rotation. A slide assembly supports a carriage where the carriage is mounted for translational movement and supports the first pivot such that the first axis of rotation may be translated transversely relative to the upright such that the first axis of rotation may be located adjacent to the first lateral edge and the second lateral edge.

In some embodiments, the first axis of rotation is substantially vertical. The slide assembly may be mounted on a lift mechanism such that the height of the device mount may be adjusted relative to the work platform. The slide assembly may be mounted on a column that is adapted to be mounted to the work platform such that the column is disposed substantially vertically. The slide assembly may support the carriage for substantially horizontal movement. The slide assembly may comprise at least one rail and the carriage may comprise an engagement structure that freely slides on the at least one rail such that the carriage may be manually moved transversely relative to the support. A center position locater may be provided that locates a center position of the carriage. The center position locater may comprise a ball and detent. The device mount may rotate about a second axis where the second axis may be orthogonal to the first axis. The device mount may be adapted to support a monitor. The technology cart may further comprise a computer. The slide assembly may be mounted on a lift mechanism such that the height of the device mount may be vertically adjusted relative to the work platform where the slide assembly supports the carriage for substantially horizontal movement with the first axis of rotation oriented substantially vertically. The first axis of rotation may be substantially vertical and the slide assembly may be mounted on a lift mechanism such that the height of the device mount may be vertically adjusted relative to the work platform, the slide assembly may support the carriage for substantially horizontal movement and the device mount may rotate about a second axis where the second axis may be orthogonal to the first axis.

BRIEF DESCRIPTION OF THE DRAWINGS

FIG. 4 is a front view of an embodiment of the mount of the invention.

FIG. 5 is a side view of the mount of FIG. 4.

DETAILED DESCRIPTION OF EMBODIMENTS OF THE INVENTION

Embodiments of the present invention will be described more fully hereinafter with reference to the accompanying drawings, in which embodiments of the invention are shown. This invention may, however, be embodied in many different forms and should not be construed as limited to the embodiments set forth herein. Like references numbers are used to refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Relative terms such as "below" or "above" or "upper" or "lower" or "horizontal" or "vertical" or "top" or "bottom" or "front" or "rear" may be used herein to describe a relationship of one element, area or region to another element, area or region as illustrated in the figures. It will be understood that these terms are intended to encompass different orientations of the device in addition to the orientation depicted in the figures.

Figure 1:
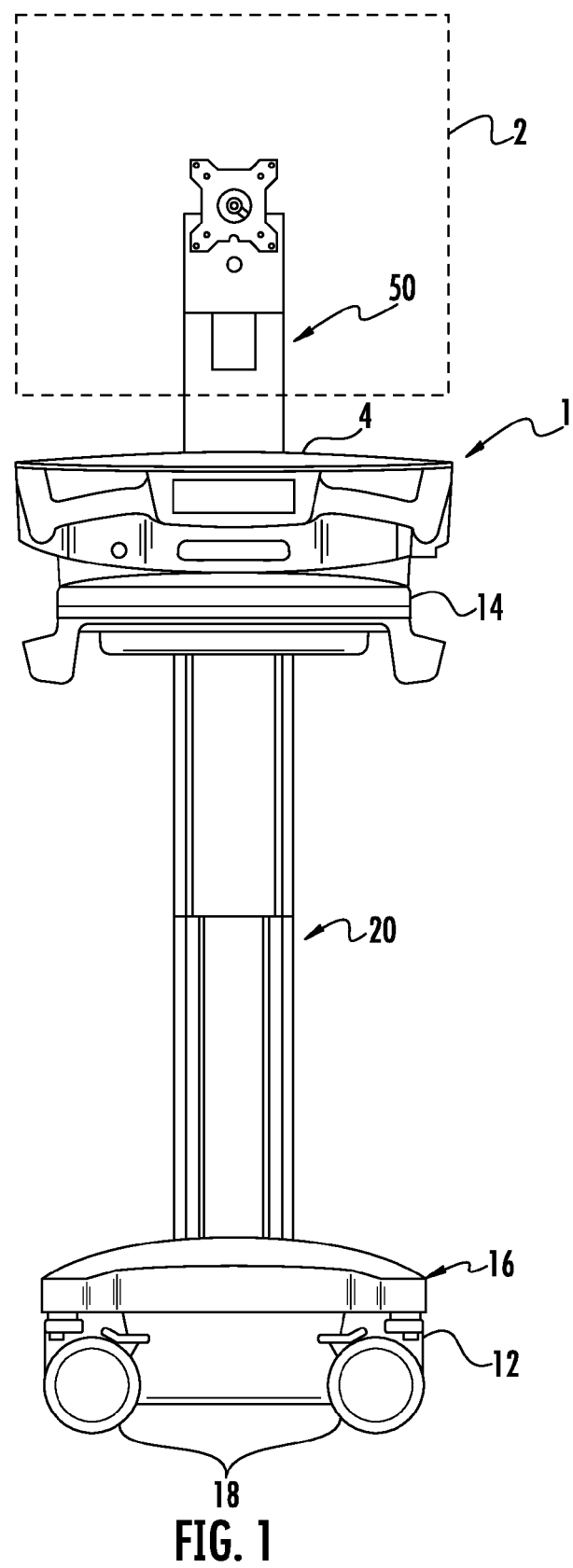
FIG. 1 is a front view of an embodiment of a technology cart and mount of the invention.
Figure 2:
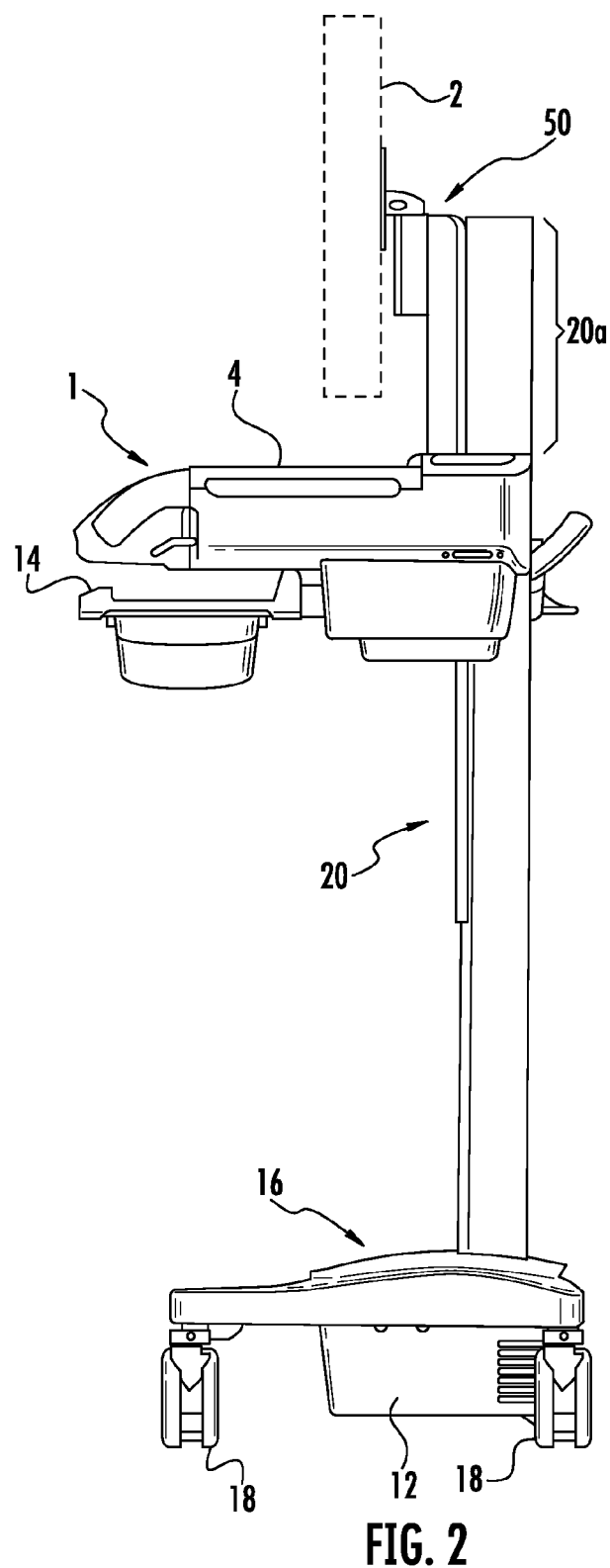
FIG. 2 is a side view of the technology cart and mount of FIG. 1.
Figure 3:
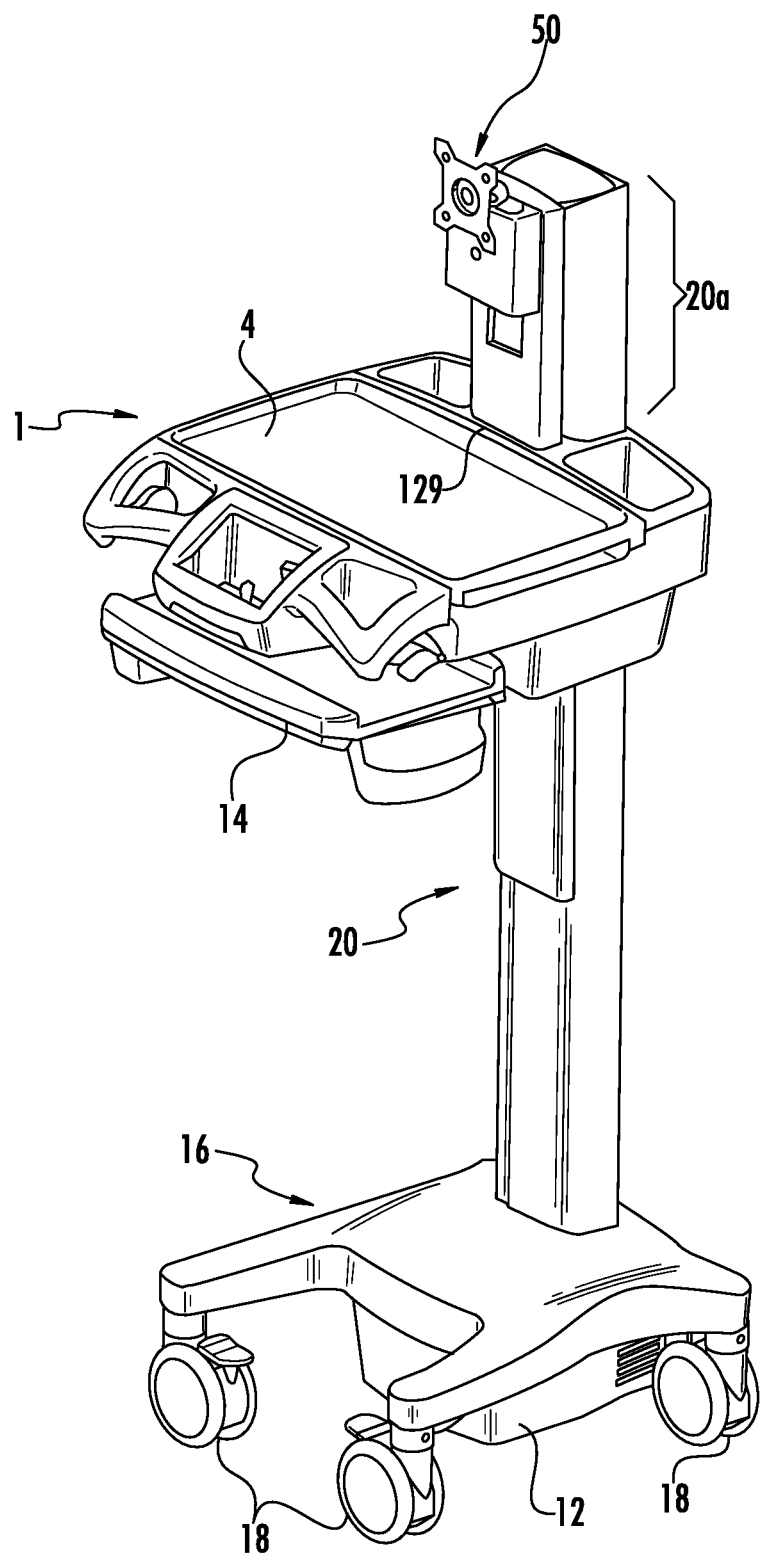
FIG. 3 is a perspective view of the technology cart and mount of FIG. 1.
Figure 6:
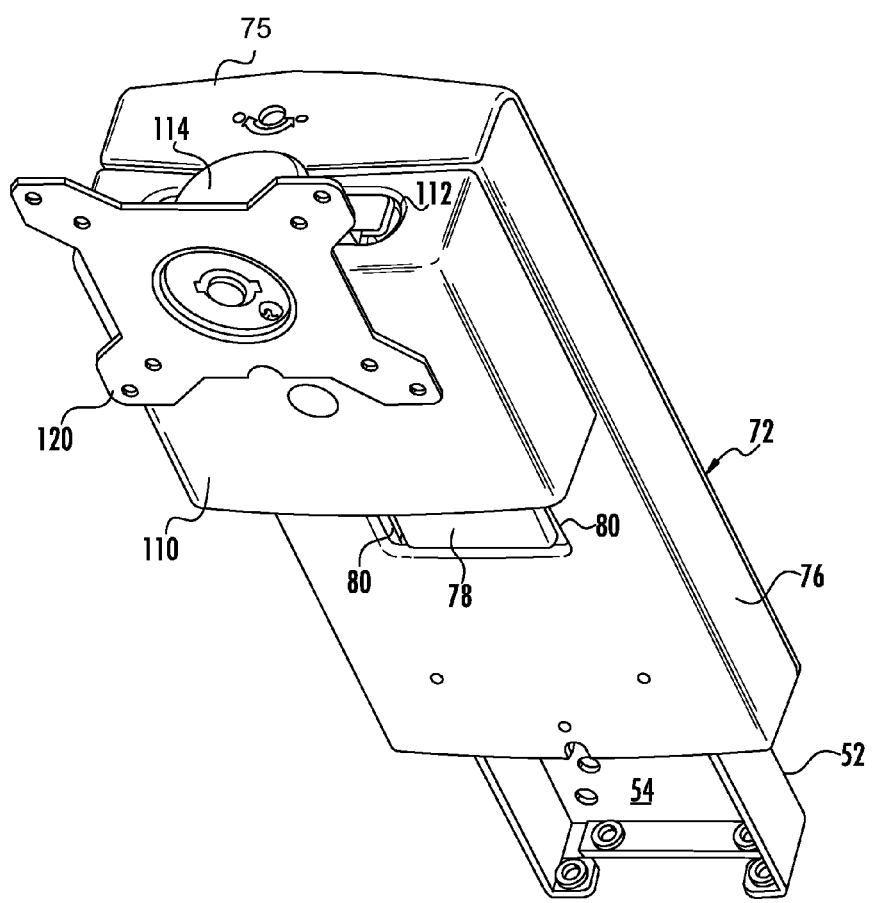
FIG. 6 is a perspective view of the mount of FIG. 4.
Figure 7:
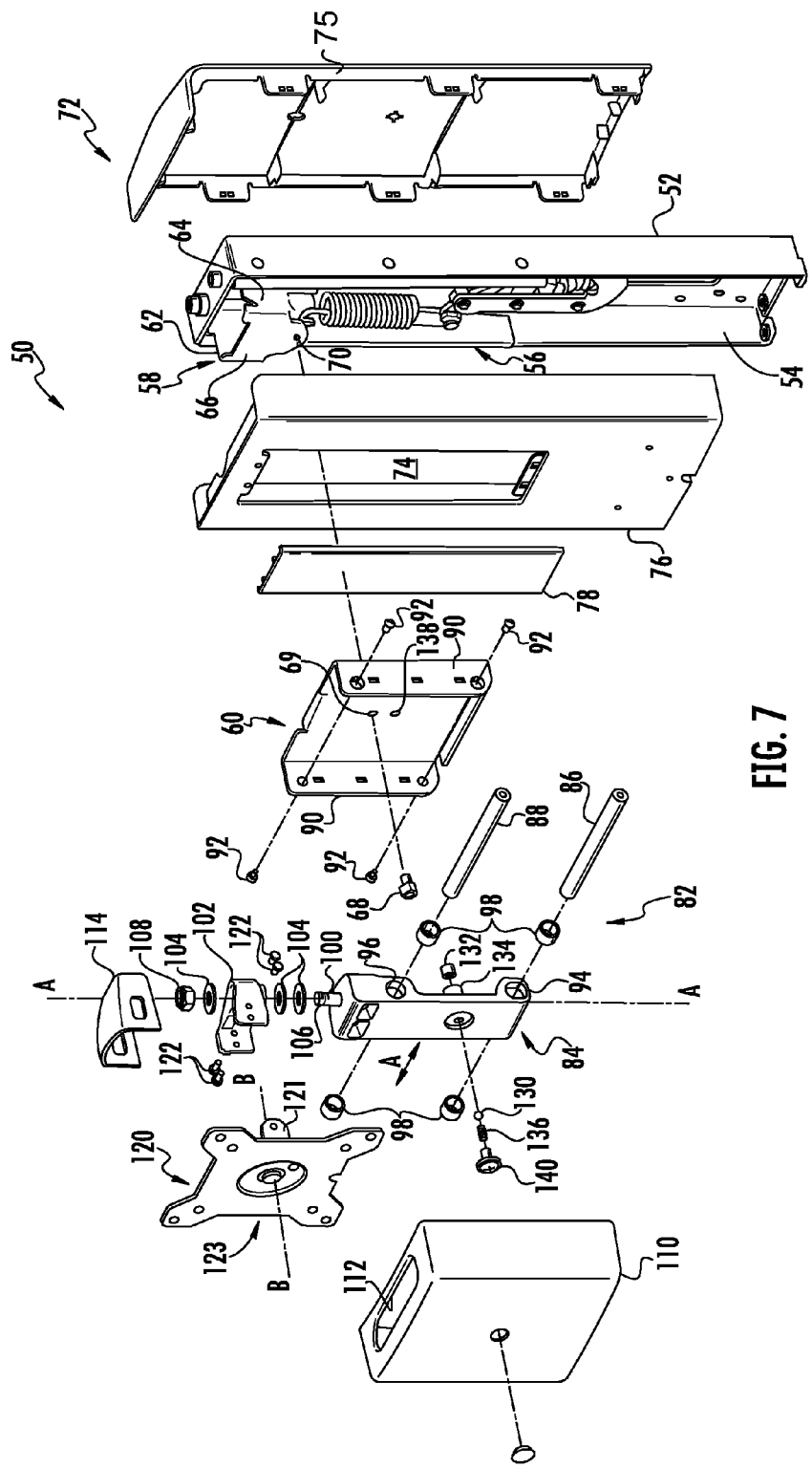
FIG. 7 is an exploded view of the mount of FIG. 4.
Figure 8:
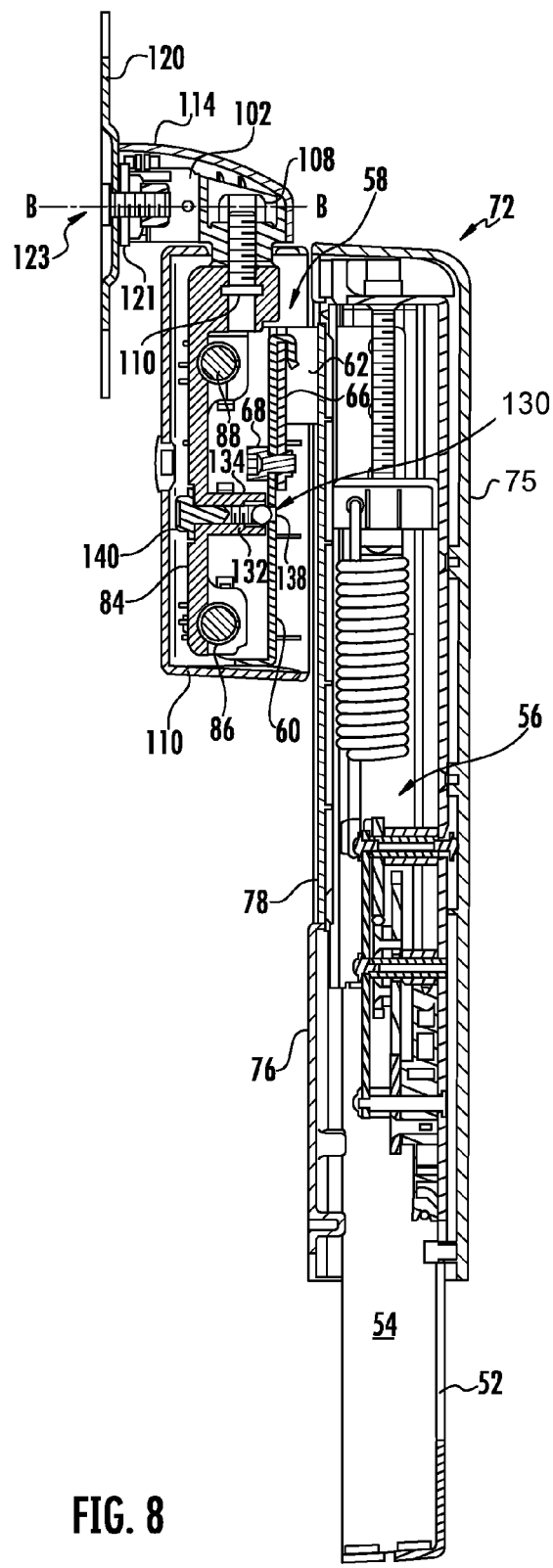
FIG. 8 is a section view of the mount taken along line 8-8 of FIG. 4.

One embodiment of a technology cart is shown in FIGS. 1 through 3. The cart comprises a work platform 1. The work platform 1 is supported on an upright 20 that is supported on a base 16. The platform 1 may support a keyboard tray 14 where the keyboard tray 14 may be movably mounted such that the tray 14 may be moved between a retracted position where it is located inside of or below the work platform 1 and an extended position where a keyboard supported on the keyboard tray 14 may be accessed by a user. Base 16 is supported on rollers or wheels 18 such that a user may push the cart over the floor. The cart may also support a computer and/or a wireless communication node such that the on-board equipment may communicate with a wider network. In one embodiment the computer may be supported inside of the work platform 1. A battery for powering the on-board technology may be supported in a battery compartment 12 on the base 16. While a general purpose cart suitable for supporting a computer and a monitor is shown, the on-board technology may comprise any piece of equipment including specialized, application specific equipment. For example, in a medical application the equipment may comprise, but is not limited to, a display for a heart monitor, blood pressure monitor or other medical device. Applications other than medical applications are also possible.

The upright 20 extends substantially vertically from base 16 and supports the work platform 1 such that the height of the work platform 1 may be adjusted to comfortably accommodate a variety of users. The work platform 1 may be moved up and down at least a portion of the length of the upright 20 such that at certain positions of the work platform 1 a portion 20a of the upright 20 may extend vertically above the work platform. A lift mechanism may be provided in the upright 20 to assist the user in moving the work platform 1 and setting the height of the work platform 1. The lift mechanism may comprise a hydraulic, pneumatic or spring cylinder, a counterweighted pulley system or other counterbalance mechanism that counterbalances the combined weight of the work platform 1 and the equipment supported by the work platform 1. The lift mechanism may be designed to also support external loads such as may be applied by a user. The lift mechanism may also comprise a motorized lift system. The cart may be made of a combination of materials including aluminum extrusions, sheet metal, cast metal and molded plastic.

A monitor, display, other user interface device, or other equipment or devices (hereinafter referred to collectively as "user device") 2 may be supported on the platform 1 such that raising or lowering of the platform 1 also raises and lowers the user device 2. As will be appreciated, space may be limited in such an application where it is desired to maintain the work surface 4 and/or work platform 1 unobstructed such that a user may utilize the work surface 4 while having access to the user device 2. Most supports use an articulating arm that is relatively large and that supports the user device 2 in a manner that obstructs and limits access to the areas below and adjacent to the user device and support. Further, in some embodiments the portion of the upright 20a that extends above the platform 1 may interfere with the ability of the monitor mounting device and/or user device 2 to articulate. A support 50 is provided that has a small footprint, and supports the user device 2 in a manner that minimizes the space occupied by the user device and allows the user device to articulate without interference with the upright 20.

Referring to FIGS. 4 through 8, in one embodiment, the support 50 comprises a column 52 that may be mounted to a surface such that the column 52 is disposed substantially vertically. The column 52 may be mounted to any suitable surface and in one embodiment the column 52 is mounted to the work platform 1 of a technology cart. The column 52 defines an interior space 54 that receives and retains a lift mechanism 56 for supporting a mounting bracket 58 for vertical movement relative to the support. The lift mechanism 56 may comprise any suitable device that allows the user device 2 to be raised and lowered relative to the column 52. The lift mechanism 56 may comprise a counterweight mechanism, a counterbalance mechanism such as a hydraulic, pneumatic or spring cylinder, a spring/pulley/lever device, a motorized system or other suitable lift mechanism.

The mounting bracket 58 is connected to and supports a mounting plate 60. In one embodiment, the mounting bracket 58 comprises a first arm 62 and a second arm 64 that are operatively connected to and supported on the lift mechanism 56. The first arm 62 and the second arm 64 support a face plate 66. Face plate 66 is connected to the mounting plate 60 such as by fastener 68 such that the mounting bracket 58 and the mounting plate 60 move vertically as a unit. In one embodiment, the fastener 68 extends through an aperture 69 in the mounting plate 60 and engages a threaded hole 70 in the face plate 66. In one embodiment the mounting bracket and the mounting plate may be formed as one-piece rather than as separate components.

The column 52 and lift mechanism 56 may be covered by a housing 72 that isolates the lift mechanism 56 from the exterior of the mount and provides a decorative appearance to the mount. The housing 72 may comprise a first housing section 75 and a second housing section 76 that may be connected to one another and/or to the column 52 such that the housing 72 is secured to and surrounds the column 52 and lift mechanism 56. The housing sections 75 and 76 and the column 52 may be connected to one another by any suitable connectors including a snap-fit connector, fasteners such as screws, friction fit or other suitable connector. The mounting bracket 58 extends through an aperture 74 in the housing 72 such that the mounting bracket 58 may move linearly relative to the column 52 and the housing 72. A cover 78 may be secured over the aperture 74 to close the aperture where the cover 78 has a width slightly smaller than the width of the aperture 74 such that two slots 80 are created in the housing 72. Slots 80 receive the arms 62 and 64 of the mounting bracket 58 with the face plate 66 and mounting plate 60 disposed outside of the housing 72.

A slide assembly 82 is supported on mounting plate 60 to provide lateral movement of user device 2. The slide assembly 82 comprises a carriage 84 that is slidably mounted on the mounting plate 60 by a slide mechanism such that the carriage 84 may move substantially horizontally relative to the mounting plate 60. In one embodiment the slide mechanism comprises rails that support carriage 84 such that the carriage 84 may be manually moved transversely on the rails relative to the support 50. In one embodiment, the slide mechanism comprises a first rail 86 and a second rail 88 that are supported by the mounting plate 60 and that extend substantially parallel to one another. In one embodiment, the rails 86 and 88 extend substantially horizontally when the support 50 is mounted in a vertical orientation. The rails 86 and 88 extend transversely to the vertical The carriage 84 supports a post 100 that is disposed substantially vertically when the carriage 84 is mounted on the rails 86 and 88. A collar 102 is rotatably mounted on the post 100 such that the collar 102 may rotate about axis A-A of the post 100 where axis A-A is orthogonal to sliding direction A. Suitable low friction bushings 104 may be used to allow free rotation of the collar 102 on the post 100. The post 100 may comprise a threaded end 106 that is engaged by a corresponding threaded nut 108 to retain the collar 102 on the post 100. Other mechanisms for mounting the collar 102 for rotation about axis A-A may be used. The cover 110 includes a slot 112 through which the post 100 extends such that when the carriage 84 is translated on rails 86 and 88 the post 100 freely translates in slot 112. A cover 114 may also be mounted over the collar 102 to isolate the collar 102 and to provide a decorative appearance.

A user device mount 120 is supported by the collar 102 (such as by fasteners 122) such that the carriage 84 and the device mount 120 translate together in the direction of arrow A when carriage 84 is moved on the slide mechanism. In one embodiment, the device mount 120 comprises a plate that is adapted to be coupled to the user device 2; however, the device mount 120 may have a wide variety of configurations, shapes and sizes. The user device 2 may be mechanically coupled to the device mount 120 using any suitable connector including screws, bolts, or the like or by a coupler such as a snap fit connection, tongue and groove connection or other suitable connector. The user device mount 120 may include a yoke 121 that is connected to the collar 102. The device mount 120 may be connected to the yoke at a pivot 123 such that the device mount 120 may rotate along a second rotational axis B-B that is orthogonal to the first rotational axis A-A and may be disposed substantially horizontally.

A center position locater is provided to assist the user in locating the carriage 84 in a center position on mounting plate 60. The center position locater may comprise a ball and detent arrangement as shown in the drawings. The center position locater in the illustrated embodiment comprises a ball 130 mounted in a sleeve 132 that is retained in a bore 134 on the carriage 84. A spring 136 biases the ball to an extended position. An adjustment screw 140 may be provided that may be threaded into or out of the bore 134 to increase or decrease the bias force on the ball 130. The mounting plate 60 comprises a detent 138 that is positioned such that the ball 130 is disposed opposite to the detent 138 when the carriage 84 is in a center position relative to the mounting plate 60. The spring 136 biases the ball 130 into engagement with the detent 138 to temporarily lock the carriage in the center position. The engagement of the ball 130 with detent 138 also provides audible and tactile feedback to the user that the device is centered. Detents may also be provided on the mounting plate 60 to lock the carriage in the extreme left and right positions if desired. The engagement of the ball 130 with the detent 138 may be overcome by the user by pushing on the monitor 2. While in the illustrated embodiment the ball is supported on the carriage and the detent is formed on the support plate, the location of the components may be reversed such that the detent is formed on the carriage and the ball is located on the support plate.

An embodiment of the operation of the mount will now be described. The column 52 is mounted to a surface such as a technology cart 1 such that the column extends substantially vertically from the surface. The column may be mounted directly in front of and closely adjacent to, or abutting, the upright 20 such that the support occupies a minimum amount of space over work platform 1. In one embodiment the column 52 extends below the housing 72 such that the exposed portion of the column 52 may be inserted into a receptacle 124 formed on the cart or other surface. A suitable connection mechanism such as fasteners may engage holes formed on the column 52 to secure the support to the surface. Other mechanisms for mounting the column to a surface may also be used. For example, the column 52 may have a pedestal based that sits on top of a surface. The connection mechanism for securing the column 52 to the surface may comprise welding, a snap fit connection, friction fit or the like. A user device 2 is mechanically coupled to device mount 120 using any suitable connection mechanism. In one embodiment, the user device 2 comprises a monitor such as a computer monitor. The user device 2 may be raised and lowered relative to the platform 1 by adjusting the height of the lift mechanism 56. Movement of the work platform 1 provides gross adjustment of the height of user device 2 and lift mechanism 56 provides fine adjustment of the height of the user device 2 and allows the height of the user device to be adjusted relative to the platform 1.

Figure 9:
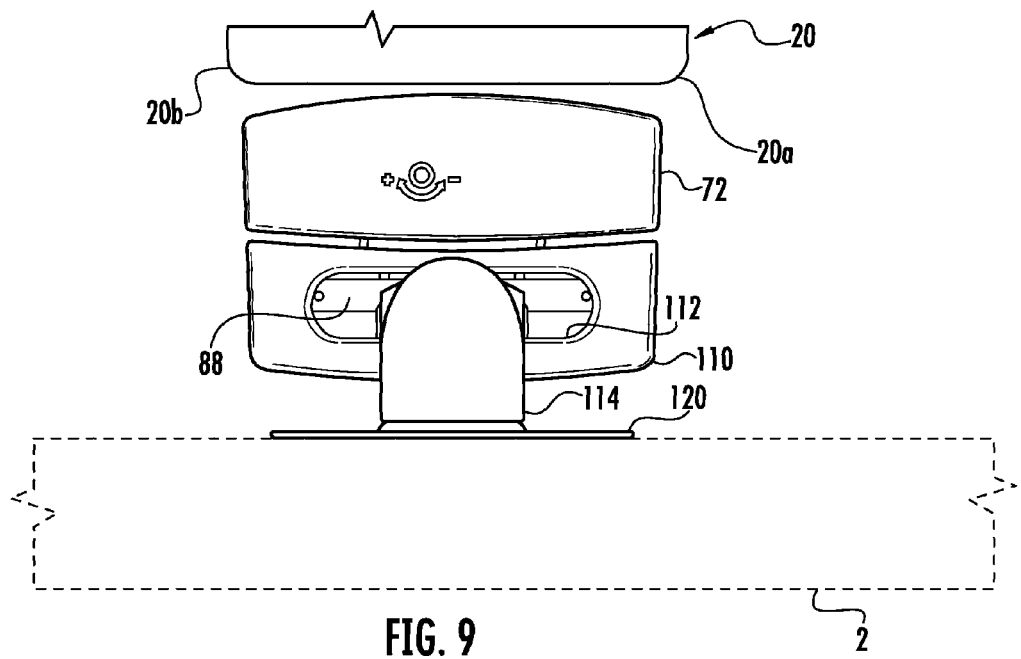
FIG. 9 is a top view of the mount of FIG. 4 in a first position.
Figure 10:
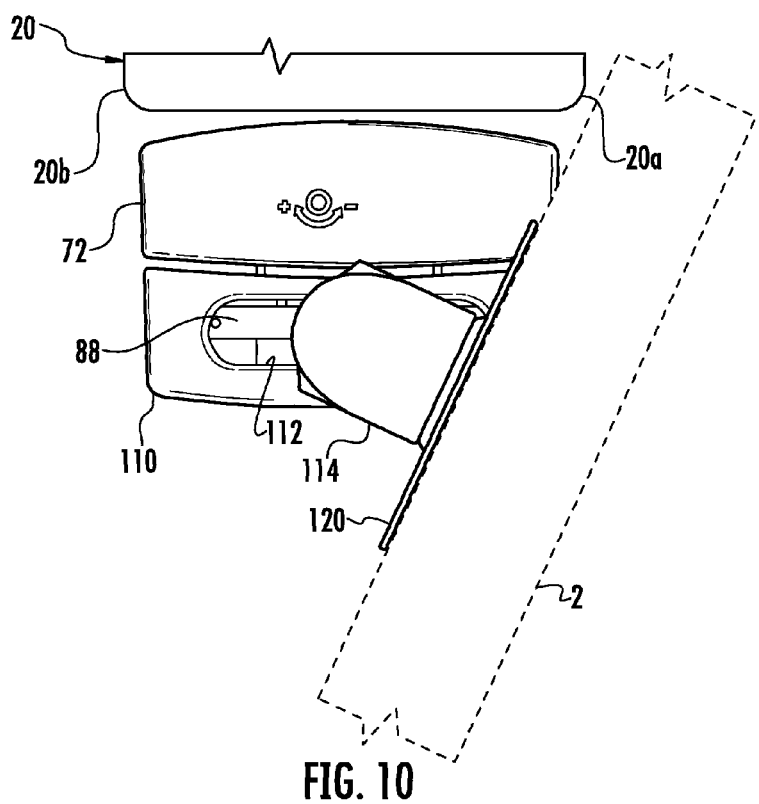
FIG. 10 is a top view of the mount of FIG. 4 in a second position.
Figure 11:
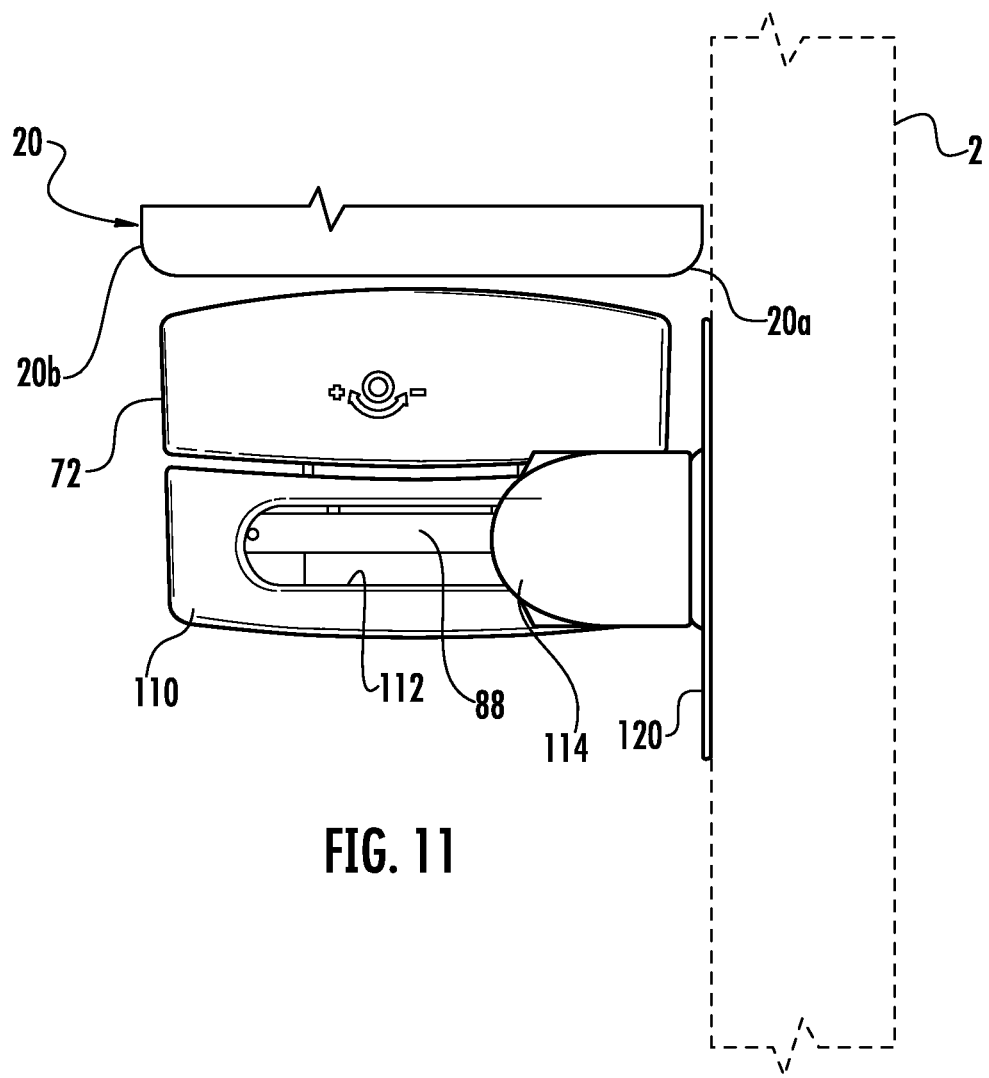
FIG. 11 is a top view of the mount of FIG. 4 in a third position.

Referring to FIGS. 9 through 11, to adjust the angular position of the user device 2, the device mount 120 may be rotated by rotating collar 102 on pin 100 about axis A-A such that the angle of the device mount 120 and the user device 2 may be easily changed by the user. While FIGS. 10 and 11 show the user device rotated to the right (counterclockwise as viewed in the drawings) it is to be understood that the user device may also be rotated in the opposite direction (clockwise as viewed in the drawings) such that the user device may be rotated in both directions. In an application such as a technology cart as shown in FIG. 1, the upright 20 that provides height adjustment of the work platform 1 may be positioned directly behind the user device 2 such that the upright 20 may impinge upon movement of the user device 2 and may limit the angle the device mount 120 may be rotated about the vertical axis A-A as shown in FIG. 10. As a result, even though the collar 102 is free to rotate about pin 100 at least 90° in each direction from the centered position of FIG. 9, contact between the user device 2 and the upright 20 may prevent the full range of motion desired by the user. To provide the full range of motion, the support of the invention allows the axis of rotation A-A to be moved or translated horizontally to position the axis of rotation to either side of the upright 20 where the upright does not interfere with the rotation of the user device 2. Specifically, the user may push the user device 2 to the left or right on slide assembly 82 such that the pivot axis A-A is likewise translated. The pivot axis A-A may be positioned such that the back of user device 2, when rotated, is at or beyond the right lateral edge 20a and left lateral edge 20b of the upright 20. In either of these positions, the user device 2 may be rotated through at least 90 degrees without interference from the upright 20 or any other similarly located obstruction. By positioning the axis A-A such that the back of user device 2, when rotated, is at or beyond at the edges 20a and 20b of the upright 20 the user device 2 may freely rotate 90 degrees in either direction as shown in FIG. 11. By positioning the axis A-A such that the back of user device 2, when rotated, is inside of, or between, the lateral edges 20a and 20b of the upright 20 the angle of rotation may be increased over that provided when the axis A-A is in the center position, although it may not reach a full 90 degrees. By moving the axis of rotation such that the back of user device 2, when rotated, is substantially beyond, or outside, the lateral edges 20a and 20b of the upright 20, the user device 2 may be free to rotate through an angle of greater than 90 degrees. Providing a transversely reciprocating pivot and axis of rotation allows the support to have a very compact size yet provides 180 degrees of rotation even where the pivot is disposed closely adjacent to an obstruction such as upright 20.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A support comprising:
    a device mount adapted to be mechanically coupled directly to a user device;
    a vertical column;
    a first pivot supporting the device mount for rotational motion about a vertical first axis of rotation relative to the column;
    a slide assembly comprising a carriage, the carriage supporting the first pivot and the carriage being movable horizontally relative to a mounting plate;
    wherein the slide assembly is mounted on a lift mechanism such that a vertical height of the device mount may be adjusted along the column.

2. The support of claim 1 wherein the slide assembly comprises a rail that supports the carriage such that the carriage may be manually moved horizontally.

3. The support of claim 1 wherein the slide assembly comprises a first rail and a second rail that extend substantially parallel to one another and substantially horizontally and the carriage spans the first rail and the second rail and includes an engagement structure that freely slides on the rails.

4. The support of claim 1 further comprising a center position locater for locating a center position of the carriage.

5. The support of claim 4 further comprising a support plate supporting the slide assembly wherein the center position locater comprises a ball on one of the carriage and the support plate that releasably engages a detent on the other one of the carriage and the support plate.

6. A technology cart comprising:
    an upright supported on wheels, the upright having a first lateral edge and a second lateral edge, the upright supporting a height adjustable substantially planar work platform;
    a device mount adapted to be mechanically coupled to a user device, the device mount being mounted on a column, the column being supported on the movable work platform such that the device mount is located vertically above the movable platform and is positioned directly in front of and closely adjacent to the upright;
    a first pivot for supporting the device mount for rotational motion about a vertical first axis of rotation such that the device mount is rotatable about the first axis relative to the column and the upright;
    a slide assembly supporting a carriage, the carriage supporting the first pivot and being mounted for free horizontal translational movement, the carriage being movable only in the horizontal direction such that the first axis of rotation is translated transversely relative to the upright such that the first axis of rotation may be located adjacent the first lateral edge and the second lateral edge such that the device mount is rotatable about the first axis of rotation to outside of the first lateral edge and the second lateral edge.

7. The technology cart of claim 6 wherein the slide assembly is mounted on a lift mechanism such that the height of the device mount may be adjusted relative to the work platform.

8. The technology cart of claim 6 wherein the slide assembly comprises at least one rail and the carriage comprises an engagement structure that freely slides on the at least one rail such that the carriage may be manually moved horizontally relative to the upright.

9. The technology cart of claim 6 further comprising a center position locater that locates a center position of the carriage.

10. The technology cart of claim 9 wherein the center position locater comprises a ball and detent.

11. The technology cart of claim 6 wherein the device mount rotates about a second axis, the second axis being orthogonal to the first axis.

12. The technology cart of claim 6 wherein the device mount is configured to support a monitor.

13. The technology cart of claim 6 further comprising a computer mounted to the device mount.

14. A technology cart comprising:
    an upright supported on wheels, the upright having a first lateral edge and a second lateral edge, the upright supporting a movable work platform;
    a device mount adapted to be mechanically coupled to a user device, the device mount being mounted on the movable work platform such that the device mount is located adjacent the upright;
    a first pivot for supporting the device mount for rotational motion about a first axis of rotation;
    a slide assembly supporting a carriage, the carriage being mounted for translational movement and supporting the first pivot such that the first axis of rotation is translated transversely relative to the upright such that the first axis of rotation may be located adjacent the first lateral edge and the second lateral edge;
    a center position locater comprising a ball and detent that locates a center position of the carriage.

15. A support comprising:
    a device mount adapted to be mechanically coupled to a user device;
    a first pivot supporting the device mount for rotational motion about a first axis of rotation;
    a slide assembly comprising a carriage, the carriage mounted for translational movement and supporting the first pivot such that the first axis of rotation is movable transversely;
    a center position locater for locating a center position of the carriage comprising a support plate supporting the slide assembly wherein the center position locater comprises a ball on one of the carriage and the support plate that releasably engages a detent on the other one of the carriage and the support plate.

* * * * *